July 9, 1940.    P. GILLI    2,207,035
ACCUMULATOR PLANT
Filed April 9, 1937
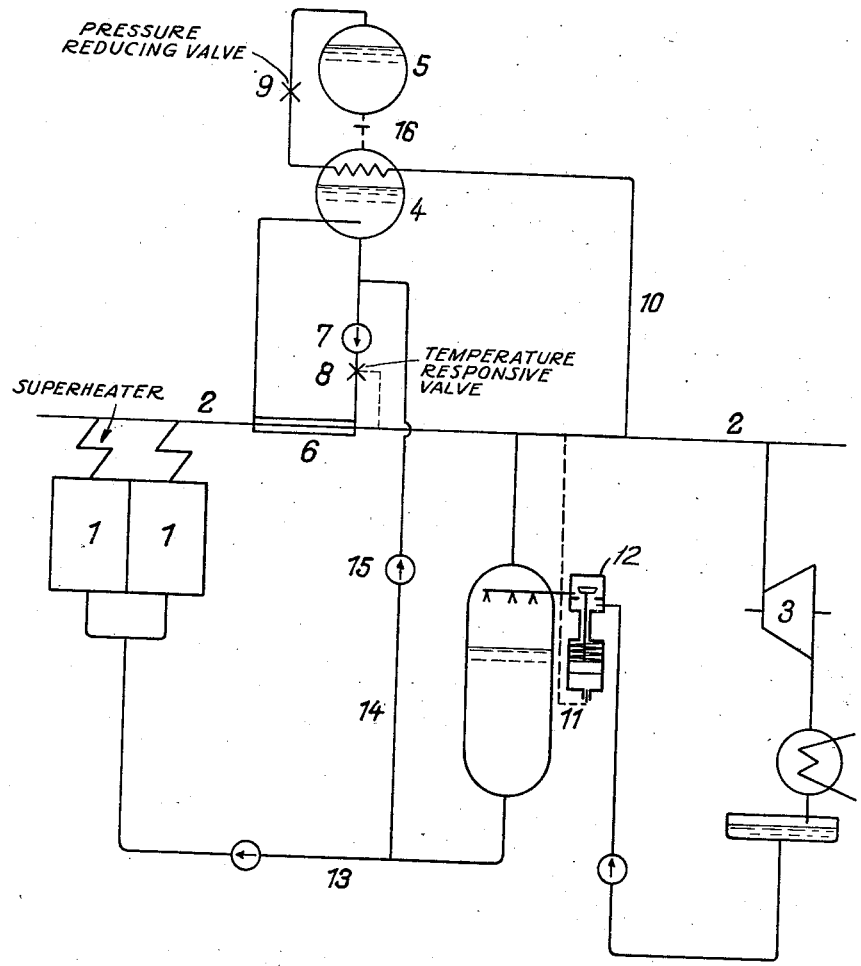

Patented July 9, 1940

2,207,035

UNITED STATES PATENT OFFICE 2,207,035

ACCUMULATOR PLANT

Paul Gilli, Vienna, Austria

Application April 9, 1937, Serial No. 135,915
In Austria April 11, 1936

4 Claims. (Cl. 122—35)

The invention refers to a high pressure accumulator plant in which the accumulator water is heated by means of superheated, non-condensing steam.

As superheat represents only a small part of the heat contents of the steam for charging, the accumulator can only be charged relatively slowly. If, therefore, the load in such a plant drops considerably, the accumulator plant is not able to take up the surplus steam.

This disadvantage is eliminated by the invention in such a way that surplus heat not taken up by the steam consumers and the high pressure accumulator is used by condensing the steam for heating the feed water of the high pressure accumulator or the steam boiler. If the heated feed water is not required immediately for feeding the high pressure accumulator or the steam boiler it can be stored in a low pressure accumulator connected to the steam net behind the charging arrangement of the high pressure plant.

Such a plant is able to take up immediately very large quantities of surplus steam and to supply steam instantaneously in case of sudden steam demand.

As a result of the feeding of the steam boiler with preheated feed water the steam generation of the boiler can be increased. It is known that this increase in efficiency is limited and amounts as a rule to 15 to 20% of the normal steam generation. The combination of a high pressure accumulator with a feed water accumulator avoids the disadvantages of both accumulator systems, the limited charging velocity of the high pressure accumulator on the one hand and the limited discharging velocity of the feed water accumulator on the other hand being compensated by the combination of the two accumulator systems. Such a plant is able to equalise the load fluctuations in all load conditions arising.

As the feed water led to the charging device already has the temperature of the saturated boiler steam, the increase in temperature of the feed water to be reached by means of the charging device is less than in such plants in which the high pressure accumulator is fed with water of lower temperature. Thus a larger quantity of feed water can be heated with the same quantity of charging steam and correspondingly the quantity of water to be stored in the low pressure accumulator can be reduced.

Depending on the load conditions of the plant it is also possible in certain cases to avoid a low pressure tank for the storage of the preheated water. If the high pressure plant consists of several high pressure tanks and the high pressure plant is not yet fully charged, it is further possible to use one or more of the high pressure tanks for the storage of water heated to lower temperature.

The plant can be operated in such a way that the surplus heat is first used for charging the high pressure accumulator, the part of the surplus heat not taken up by the high pressure accumulator being supplied to the low pressure accumulator.

The attached drawing shows an example of the invention. Steam boilers 1 provided with superheaters supply steam to line 2, to which turbine 3 and other consumers not shown in the drawing are connected. The high pressure accumulator plant consists of tanks 4 and 5, the first of which is connected by a pipe line to pre-heater or evaporator 6. Pump 7 serves for the circulation of the accumulator water to be heated or for the supply of the water to be evaporated in device 6. Device 6 may be inserted anywhere, for instance in the accumulator itself.

Regulating valve 8 governs the water flow in the charging system in such a way that the temperature of the boiler steam behind device 6 does not fall below a certain limit, or that this temperature is kept practically constant. Steam is taken from the high pressure accumulator by means of the reducing valve 9 governed by the pressure in line 2 and is passed through pipe 10 into steam pipe 2.

Regulator valve 8 is arranged to be operated in response to the temperature of the steam leaving the heat exchanger 6 in such a manner that the valve starts to close upon a reduction in the temperature of the steam and starts to open upon an increase in this temperature. Inasmuch as valve 8 controls the flow of fluid to be heated in the heat exchanger 6, the above described operation of the valve serves to maintain substantially constant the temperature of the heated fluid discharged from the heat exchanger. Valve 9 is the usual reducing valve connected in the outlet from a steam accumulator and is arranged to be operated in response to pressure fluctuation in the steam line to which the accumulator supplies steam. Thus, upon a drop in this pressure, the valve 9 opens to supply steam from the accumulator, to thus increase the pressure in the steam line. Valve 12 controls the admission of feed water into the low pressure accumulator 11 and is arranged to be operated in response to the steam pressure in the line 2, in such a manner that the valve opens upon an increase in steam pressure. The opening of valve 12 admits a greater amount of water to the low pressure accumulator which requires a greater amount of steam from the line 2 to heat it. If the pressure in line 2 fails, the valve 12 closes and steam is not withdrawn to the accumulator.

Feed water accumulator 11 is connected to steam pipe 2 behind charging device 6. Water is supplied to the accumulator by means of regulating valve 12 and heated water is passed through pipe 13 for feeding the boiler. Regulating valve 12 can be governed by the pressure in pipe 2. Under normal conditions the quantity of water fed through pipe 13 to the boiler plant 1 is equal to the quantity of steam condensed in accumulator 11 plus the quantity of water supplied through valve 12. If the steam demand of the plant increases then the pressure in pipe 2 drops and valve 12 throttles the water supply to the accumulator so that less steam is condensed and more steam flows through pipe 2 to the consumers. If this is not sufficient to cover the steam demand valve 9 is opened and the steam required is taken from the high pressure accumulator and led into pipe 2. Valve 9 is adjusted at a somewhat lower pressure than valve 12.

The charging of the high pressure plant is effected by means of charging device 6, in which water from accumulator tank 4 or water supplied through pump 15 is heated. Container 5 is charged with steam flowing from container 4 through stop valve 16. The charging of the high pressure accumulator plant is regulated by valve 8, which is governed by the steam temperature behind charging device 6 in such a way that it opens when the temperature exceeds a certain value and closes when it falls below this value.

The charging of low pressure accumulator 11 is regulated by valve 12 which is governed dependent on the pressure in pipe line 2. If the pressure in this pipe exceeds a certain value, valve 12 lets more water enter into accumulator 11, so that a larger steam quantity is condensed.

The operation of the high pressure accumulator plant and of the low pressure accumulator is combined in the following way:—If charging device 6 does not take up all the surplus heat and if the temperature of the superheated steam increases because the heat surface of charging device 6 is too small to draw the intended superheat from the steam flowing through main pipe 2, then the steam temperature in turbine 3 increases. The steam consumption of this engine thus decreases and the result is that too much steam exists in pipe 2. The increase in pressure thus caused opens valve 12 and surplus steam is condensed in low pressure accumulator 11.

Of special advantage is the combination of high pressure accumulator and feed water accumulator in boiler plants with two pressures, the high pressure accumulator having the same or higher pressure than the higher pressure boilers, the low pressure accumulator being supplied with steam from the lower pressure boilers. According to the invention the feed water for the high pressure accumulator is either preheated by the steam supplied by the low pressure boiler and then by the steam supplied by the high pressure boiler, or merely by steam from the high pressure boiler, in order to take up surplus steam from the two boiler plants, or in the latter case from the high pressure boilers only.

The invention can be applied in various ways. In place of and in addition to feed water accumulators variable pressure accumulators from which steam is taken can also be used.

I claim:

1. The process of generating high pressure steam which comprises generating and superheating an initial supply of superheated steam, utilizing a portion of said superheated steam to heat water and generate a second supply of high pressure steam, combining both said steam supplies, condensing a portion of the superheated steam to preheat feed water to a temperature substantially corresponding to the temperature of said first steam supply and utilizing the preheated water in the generation of said second supply of high pressure steam.

2. The process of generating high pressure steam which comprises generating and superheating an initial supply of superheated steam, utilizing a portion of said superheated steam to heat a body of water to a temperature corresponding to a saturated steam pressure higher than the pressure of the superheated steam thereby generating a second supply of steam, condensing a portion of the superheated steam to preheat feed water to a temperature corresponding to the pressure of the superheated steam, utilizing the preheated water in heating said body of water and aiding in generating a second supply of steam and combining both said supplies of steam.

3. In a steam plant, a steam generator and superheater for producing superheated steam, a line for conducting said steam to a point of use, a high pressure accumulator vessel for holding a body of water, a surface heat exchanger for heating said body of water by means of the heat of superheat of said steam, a contact heat exchanger, means for supplying said contact heat exchanger with steam discharged from said surface heat exchanger, means for supplying feed water to said contact heat exchanger, and means for conveying heated water from said contact heat exchanger to said high pressure accumulator vessel, and means for conveying steam from said accumulator vessel to said point of use.

4. In a steam plant, a steam generator and superheater for producing superheated steam, a line for conducting said steam to a point of use, a high pressure accumulator vessel for holding a body of water, a surface heat exchanger for heating said body of water by means of the heat of superheat of said steam, a low pressure accumulator vessel, means for supplying said low pressure accumulator vessel with steam discharged from said heat exchanger and with feed water, and means for conveying heated water from said low pressure accumulator vessel to said high pressure accumulator vessel and for conveying steam from said high pressure accumulator vessel to said point of use.

PAUL GILLI.